Sept. 6, 1932. G. W. VEALE 1,876,112
TIE BAR FOR BUMPERETTES
Filed May 1, 1930

Inventor
George W. Veale
Kwis Hudson & Kent
attys.

Patented Sept. 6, 1932

1,876,112

UNITED STATES PATENT OFFICE

GEORGE W. VEALE, OF CLEVELAND HEIGHTS, OHIO, ASSIGNOR TO THE EATON MANUFACTURING COMPANY, OF CLEVELAND, OHIO, A CORPORATION OF OHIO

TIE BAR FOR BUMPERETTES

Application filed May 1, 1930. Serial No. 449,061.

This invention relates to connecting devices for bumperettes, and as its principal object aims to provide an improved form of construction for devices of this character.

Further objects and advantages of this invention will be apparent from the following description taken in connection with the accompanying sheet of drawing in which Fig. 1 is a rear elevational view of a vehicle equipped with bumperettes to which a connecting device embodying my invention has been applied.

Figure 1:
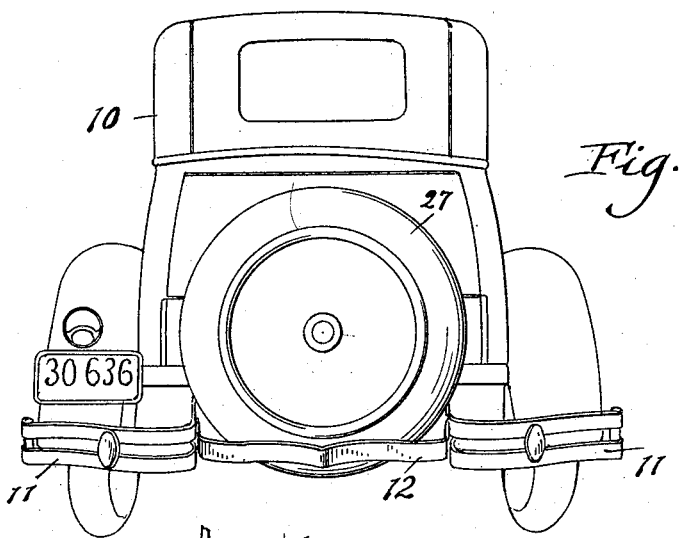

In the drawing to which I shall now refer in detail in describing my invention, I have shown a bumperette connecting device which may be installed by the manufacturer as a part of the original equipment of the vehicle, or which may be quickly and easily applied to the bumperettes as an accessory.

In Fig. 1 I have shown a vehicle 10 equipped with a pair of bumperettes 11 to which the connecting device 12 has been applied. The bumperettes may be of any suitable form but, as here illustrated, they comprise vertically spaced impact bars 13 which are supported intermediate their ends by being clamped to one end of a flexible supporting bar 14. The other end of this supporting bar extends forwardly and is clamped to a suitable portion of the vehicle structure, and also to the flange 15, which extends rearwardly from the transverse member 16. At their inner ends, that is to say at their ends which are nearest the center line of the vehicle, the impact bars are provided with substantially straight portions 17 which are secured, as by means of rivets, to a plate member 18. This plate member is, in turn, clamped to the flange 15 by means of suitable bolts 19 which also extend through the flexible supporting arm 14.

Figure 2:
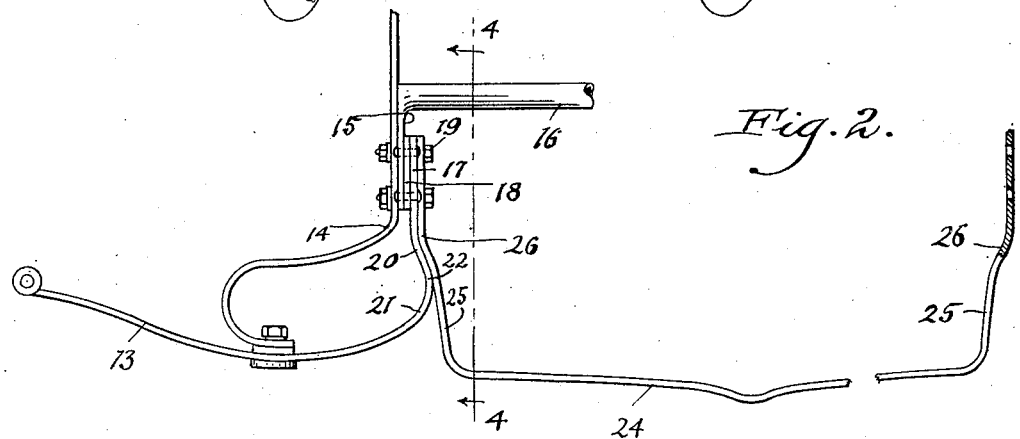
Fig. 2 is a top plan view showing one of a pair of bumperettes and the manner of attaching one end of my connecting device thereto.
Figure 3:
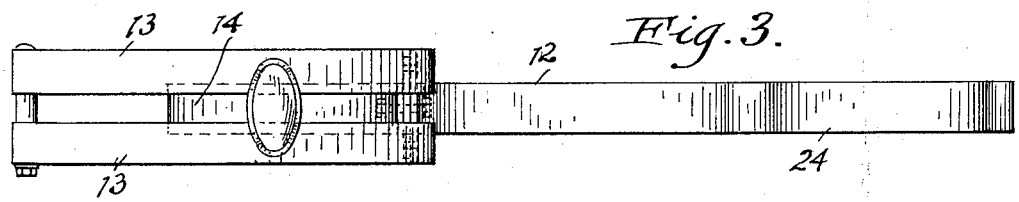
Fig. 3 is an elevational view of the arrangement shown in Fig. 2.
Figure 4:
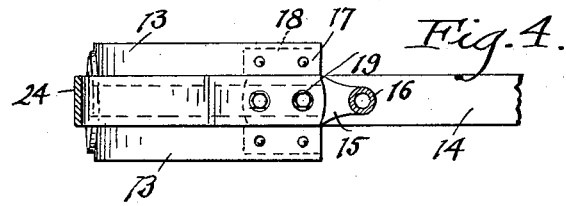
Fig. 4 is a sectional elevation taken on line 4—4 of Fig. 2.

As clearly shown in Fig. 2 of the drawing, just rearwardly of their straight inner end portions, the impact bars are reversely curved, that is, are curved first inwardly toward the center line of the vehicle, as indicated at 20, and then outwardly away from this center line, as indicated at 21, to extend transversely in a protective position rearwardly of the fenders. These reversely curved portions of the impact bars provide the bumperettes with rounded inner-end portions 22 which extend inwardly of the supporting members to which the bumperettes are attached.

The connecting device of my invention, when assembled in place, extends transversely between the pair of bumperettes. This connecting device is constructed of suitable material, such as a bar 24 of spring steel, having the ends thereof bent to provide forwardly extending supporting arms 25. These supporting arms terminate in substantially straight end portions which are clamped to the inner ends of the bumperettes by the same clamping means which secures the plate 18 and the flange 15 to the supporting bar 14. Just rearwardly of these straight portions, the supporting arms of the connecting device are bent as shown at 26, to correspond in shape with, and to engage the reversely bent portions provided at the inner ends of the bumperettes. When secured in place in this manner, the correspondingly curved portions of the connecting device and of the bumperettes interengage at a point rearwardly of the supporting portion of the vehicle structure so that the connecting device will materially reinforce the bumperettes against deflection resulting from blows delivered angularly against the bumperettes.

The forwardly extending supporting arms of the connecting device are preferably made sufficiently long so that the transversely extending portion of this device will be spaced rearwardly a small distance from the spare wheel 27 supported at the rear of the vehicle. The bumperette connecting device thus affords some protection for the spare wheel. This connecting device may be suitably finished to harmonize with the finish of the bumperettes and other portions of the vehicle, and thus, in addition to its function of reinforcing the bumperettes, and its function of protecting the spare wheel, it also adds to the attractiveness of the vehicle.

It will now be readily seen that I have provided a simple form of connecting device which can be easily and quickly applied to a vehicle, and which materially reinforces the bumperettes and also enhances the appearance of the vehicle.

While I have disclosed my invention in a detailed manner, it should be understood, however, that I do not intend to limit myself to the precise construction and arrangements of parts shown and described, but regard my invention as including such changes and modifications as do not involve a departure from the spirit of the invention and the scope of the appended claim.

Having thus described my invention, I claim:

A bumperette connecting member comprising a bar provided with forwardly extending arms, said arms having substantially straight end portions adapted to be clamped to the bumperette supporting means and also having curved portions adjacent said straight portions adapted to engage the forward side of curved portions of the bumperettes which extend inwardly of said supporting means.

In testimony whereof, I hereunto affix my signature.

GEORGE W. VEALE.

CERTIFICATE OF CORRECTION.

Patent No. 1,876,112. September 6, 1932.

GEORGE W. VEALE.

It is hereby certified that the name of the assignee in the above numbered patent was erroneously described and specified as "The Eaton Manufacturing Company", whereas said name should have been described and specified as Eaton Manufacturing Company, as shown by the records of assignments in this office; and that the said Letters Patent should be read with this correction therein that the same may conform to the record of the case in the Patent Office.

Signed and sealed this 22nd day of November, A. D. 1932.

(Seal)

M. J. Moore,
Acting Commissioner of Patents.